(12) United States Patent
McDonald et al.

(10) Patent No.: US 11,628,696 B2
(45) Date of Patent: Apr. 18, 2023

(54) METHODS AND APPARATUS FOR A THREE-POINT ATTACHMENT TRAILER HITCH

(71) Applicant: Ford Global Technologies, LLC, Dearborn, MI (US)

(72) Inventors: Patrick McDonald, Livonia, MI (US); Steven Paul Sic, Monroe, MI (US); Zane Butterfield, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 17/170,459

(22) Filed: Feb. 8, 2021

(65) Prior Publication Data
US 2022/0250423 A1    Aug. 11, 2022

(51) Int. Cl.
*B60D 1/07*    (2006.01)
*B60R 9/06*    (2006.01)
*B60D 1/48*    (2006.01)
*B60D 1/00*    (2006.01)

(52) U.S. Cl.
CPC .............. *B60D 1/07* (2013.01); *B60D 1/485* (2013.01); *B60R 9/06* (2013.01); *B60D 2001/008* (2013.01)

(58) Field of Classification Search
CPC .... B60D 1/07; B60D 1/485; B60D 2001/008; B60R 9/06
See application file for complete search history.

(56) References Cited

U.S. PATENT DOCUMENTS

| | | | |
|---|---|---|---|
| 3,760,516 A | 9/1973 | Billingsley | |
| 4,664,403 A * | 5/1987 | Livingston | B60D 1/06 280/492 |
| 5,620,198 A * | 4/1997 | Borchers | B60D 1/52 280/491.5 |
| 6,139,044 A * | 10/2000 | Smith | B60D 1/247 280/505 |
| 6,234,512 B1 * | 5/2001 | Bettenhausen | B60D 1/60 280/495 |
| 6,428,031 B1 | 8/2002 | McCoy et al. | |
| 6,742,799 B1 | 6/2004 | Hansen | |
| 7,146,754 B2 * | 12/2006 | Schultz | E01H 5/06 37/231 |
| 7,549,668 B2 * | 6/2009 | Binkowski | B60D 1/485 280/495 |
| 7,963,052 B2 | 6/2011 | Koch et al. | |
| 8,079,611 B2 * | 12/2011 | Schroeder | B60D 1/06 280/472 |
| 8,562,013 B1 | 10/2013 | Wentz, Jr. | |
| 9,731,569 B2 * | 8/2017 | McGuckin | B60D 1/485 |

(Continued)

*Primary Examiner* — Jacob D Knutson
*Assistant Examiner* — Michael R Stabley
(74) *Attorney, Agent, or Firm* — Hanley, Flight & Zimmerman, LLC; Lorne Forsythe (57) ABSTRACT

Methods and apparatus are disclosed for a three-point attachment trailer hitch. An example hitch includes a crossbar including a first end and a second end, the first end or the second end including at least one tab protruding from an edge of the first end or the second end, and a first endplate positioned on the first end or the second end of the crossbar using the at least one tab, the endplate including a first threaded hole and a second threaded hole, a diameter of the second threaded hole larger than a diameter of the first threaded hole.

20 Claims, 6 Drawing Sheets

(56) References Cited

U.S. PATENT DOCUMENTS

| | | |
|---|---|---|
| 10,111,374 B2 | 10/2018 | Harnetiaux |
| 10,632,802 B1 * | 4/2020 | Bertalon ................ B60D 1/363 |
| 10,696,112 B2 * | 6/2020 | Meingast ............... B60D 1/485 |
| 10,953,713 B2 * | 3/2021 | Belinky ................. B60D 1/485 |

* cited by examiner

METHODS AND APPARATUS FOR A THREE-POINT ATTACHMENT TRAILER HITCH

FIELD OF THE DISCLOSURE

This disclosure relates generally to vehicle hitches and, more particularly, to methods and apparatus for a three-point attachment trailer hitch.

BACKGROUND

Different vehicle models often have different configurations, including spare tire placement, fuel tank placement, floorboard height, frame rail spacing, etc. As a result, a hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle and often has a square cross-section. A crossbar is used to connect the driver and passenger sides of a vehicle frame to the receiver tube. Hitch selection can depend on several factors, including the type of towing needs (e.g., light-duty trailer towing, frequent towing of heavier trailers, etc.) and/or use of hitch receiver attachments (e.g., bike racks, cargo carriers, etc.) for cargo management.

SUMMARY

Methods and apparatus for a three-point attachment trailer hitch are disclosed. An example hitch includes a crossbar including a first end and a second end, the first end or the second end including at least one tab protruding from an edge of the first end or the second end. The example hitch also includes a first endplate positioned on the first end or the second end of the crossbar using the at least one tab, the endplate including a first threaded hole and a second threaded hole, a diameter of the second threaded hole larger than a diameter of the first threaded hole.

An example apparatus includes a hitch including a crossbar having a first end and a second end, the first end or the second end including at least one tab protruding from an edge of the first end or the second end and a first endplate positioned on the first end of the crossbar using the at least one tab, the endplate including a threaded hole. The example apparatus also includes a first tow ball attached to the threaded hole of the endplate, the first tow ball including a processor, and a load manager to determine a load condition based on data received from the processor of the first tow ball.

An example method includes receiving data from a first tow ball attached to a first endplate, the first endplate positioned on a first end of a hitch crossbar, the crossbar including at least one tab protruding from an edge of the first end of the crossbar to receive the first endplate, and determining a load condition based on the input data.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

The maximum weight a given vehicle can tow (e.g., towing capacity) is determined by the vehicle manufacturer and takes into consideration several ratings, including a vehicle weight rating (e.g., maximum loaded weight of a vehicle and/or a trailer), a combined vehicle rating (e.g., maximum weight of vehicle with a fully loaded trailer attachment), and an axle weight rating (e.g., maximum weight that can be placed on front/rear axles), as well as a tongue weight (e.g., downward force exerted on the back of the tow vehicle). A vehicle hitch can be attached to a vehicle chassis (e.g., load-bearing framework) for purposes of towing. However, many vehicle hitch designs are specific to individual vehicle models and, thus, can require the hitch to have unique shapes and parts specific to each vehicle model. Variations in hitch design between vehicle models can be attributed to the shape of the rear bumper housing, packaging requirements for the spare tire, floorboard height, frame rail spacing, etc. Additionally, a hitch can be selected based on the type of towing needs (e.g., light-duty trailer towing, frequent towing of heavier trailers, etc.) and/or use of hitch receiver attachments (e.g., bike racks, cargo carriers, etc.) for cargo management.

Known vehicle platforms offer hitch products with a single structural attachment point designed for attachments dedicated to trailer use. However, vehicles (e.g., pick-up trucks, etc.) are frequently used for additional cargo-based attachments (e.g., bike racks, cargo carriers, etc.) and/or equipment usage (e.g., drag plow, tailgate salter, etc.), all of which can require two additional structural attachment points for stability. Given the lack of additional structural attachment points to many known hitches, users apply rudimentary means for securing and stabilizing such cargo-based attachments and/or equipment (e.g., ad-hoc ratchet straps attached to a bumper cover). Such short-term solutions can result in damage to the vehicle tailgate as well as the bumper surface finish and can result in lasting damage to the vehicle when the hitch, the bumper, and/or the tailgate is subjected to unintended loading (e.g., torsional twisting of the hitch, etc.). Accordingly, two more structural attachment points (e.g., tie-down points) to supplement the existing trailer-based attachment point (e.g., for a drawbar) would be beneficial for stabilizing additional loading while mitigating the potential for torsional loading at areas that are known to serve as ad-hoc attachment points (e.g., bumpers, tailgates, etc.).

Examples disclosed herein describe methods and apparatus for a three-point attachment trailer hitch. In the examples disclosed herein, two additional universally-adaptable attachment points are described for stabilization of cargo-based maintenance products (e.g., bike carriers, luggage racks, etc.), equipment (e.g., snow removal pull plows, tailgate salt spreaders, etc.), and/or any type of hitch accessory. In the examples disclosed herein, a crossbar of the hitch includes one or more tab(s) protruding from opposing edges of the crossbar to orient respective endplates positioned on opposing ends of the crossbar. In the examples disclosed herein, each endplate includes one or more threaded hole(s) adjacent to the endplate perimeter, such that the threaded hole(s) can provide attachment point(s) for a lighter load (e.g., bike carrier). In the examples disclosed herein, the endplates can include a threaded hole centered within the endplate for attachment of a tow ball. In some examples, the threaded hole centered within the endplate can be used for positioning a pivot pin to secure heavier loads having potential for greater torsional loading (e.g., snow plow, etc.). In the examples disclosed herein, a three-point crossbar attachment system for a load path attachment (e.g., a trailer) is used to counteract torsional twisting of the hitch. For example, push pull coil spring swivel arms can be used to connect a tow ball attached to each end of the crossbar tow ball(s) separately positioned on the load path attachment. For example, the push pull coil spring swivel arms can be used to replace a chain and torsion bar system for improved backing capability (e.g., reduce potential disconnections).

In the examples disclosed herein, a load manager can be used to determine a load condition based on data received from the tow balls positioned on the crossbar and/or the load path attachment. As such, methods and apparatus disclosed herein supplement existing hitch-based components to stabilize their torsional loading in addition to the existing tensile and compression loads supported by the hitch systems. Furthermore, methods and apparatus disclosed herein improve the stabilization of loads attached to the hitch by providing universally adaptable attachment points that can be used for attachment of any type of hitch accessory.

Figure 1:
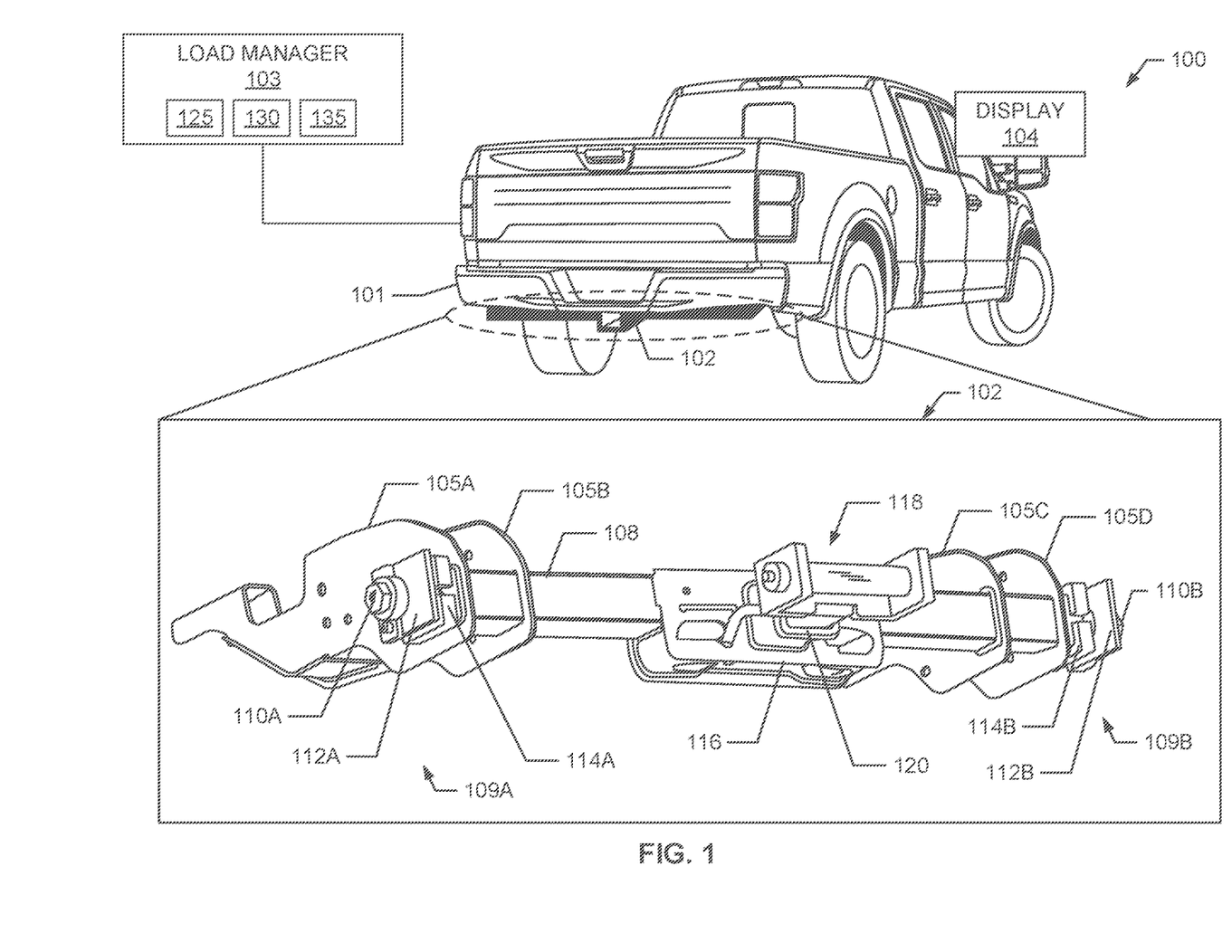
FIG. 1 illustrates an example vehicle including a hitch system load manager and a hitch including three potential points of attachment, as described in accordance with the examples disclosed herein.

FIG. 1 illustrates an example vehicle 100 including an example bumper 101, an example hitch 102, and an example load manager 103 by which the examples disclosed herein may be implemented. The load manager 103 is communicatively coupled to at least one example display 104. In the illustrated example of FIG. 1, the hitch 102 includes example first frame mounting member(s) 105A, 105B and example second frame mounting member(s) 105C, 105D. The frame mounting members 105A-D may be integral portions of the frame of the vehicle 100 or otherwise rigidly and fixedly attached to the frame of the vehicle 100. The example of FIG. 1 also includes an example crossbar 108, example crossbar attachment point(s) 109A, 109B, an example chain bracket 116, an example receiver tube attachment point 118, and an example receiver tube 120. The crossbar attachment point(s) 109A, 109B include example pivot pin(s) 110A, 110B, example load attachment member(s) 112A, 112B, and example endplate(s) 114A, 114B. In the examples disclosed herein, the load attachment member(s) 112A, 112B and/or the endplate(s) 114A, 114B positioned on both sides of the crossbar 108 (e.g., at crossbar attachment point(s) 109A and 109B) can be used to form a three-point crossbar attachment system (e.g., in combination with the receiver tube attachment point 118). In some examples, one of the crossbar attachment point(s) 109A or 109B (e.g., including one of the load attachment member(s) 112A, 112B and/or the endplate(s) 114A, 114B) can remain unused and/or not included in the crossbar attachment system (e.g., depending on the load path attachment and/or type of hitch accessory).

In the illustrated example of FIG. 1, the vehicle 100 can tow a trailer coupled to the vehicle 100 via the hitch 102. For example, a tow ball can be coupled to the hitch 102 via the receiver tube 120. The coupled tow ball enables a trailer to be pivotally coupled to the hitch 102. In some examples, the vehicle 100 can be used to transport cargo attached to the vehicle 100 via the hitch 102. For example, the hitch 102 can provide multiple attachment points (e.g., crossbar attachment point(s) 109A, 109B and/or receiver tube attachment point 118) for attaching cargo-based maintenance products (e.g., bike carriers, luggage racks, etc.), equipment (e.g., snow removal pull plows, tailgate salt spreaders, etc.), and/or any type of hitch accessory. As described in the examples disclosed herein, each of the endplate(s) 114A, 114B can be used alone as an attachment point for use in applications that produce reduced torsional loading (e.g., a bike rack) or in combination with the pivot pin 110 for use in applications that produce increased torsional loading (e.g., a drag plow with potential for side-to-side twisting). In the illustrated example, the vehicle 100 is a consumer automobile. In other examples, the vehicle 100 can be a commercial truck, a motorcycle, a motorized cart, an all-terrain vehicle, a motorized scooter, or any other vehicle.

The load manager 103 receives load information (e.g., forces, torques, etc.) from one or more tow ball(s) attached to the crossbar 108 (e.g., via the endplate(s) 114A, 114B) and/or one or more tow ball(s) positioned on the load path attachment (e.g., a trailer). As described in connection with FIG. 4, push pull coil spring swivel arm(s) can be used to connect the tow ball(s) attached to the crossbar to the tow ball(s) positioned on the load path attachment. In some examples, the load manager 103 can analyze the received load information to determine a load condition of the vehicle 100 and/or the hitch 102. For example, the load manager 103 can determine whether torsional loading exceeds a set threshold value. In some examples, if the load condition satisfies an alert threshold, the load manager 103 can generate an alert to indicate to a user of the vehicle 100 that the vehicle 100 is improperly loaded. The load manager 103 can be communicatively coupled to the example display 104.

The display 104 can be, in some examples, within an interior of the vehicle 100 (e.g., a dashboard display, an overhead display, etc.). Additionally or alternatively, the display 104 can be included in a mobile device (e.g., a smartphone, a tablet, a smartwatch, etc.) of an operator or a passenger of the vehicle 100. In some examples, the display 104 can display the load condition determined by the load manager 103. In some examples, the display 104 can present an alert to a user of the vehicle 100 when a load condition satisfies an alert threshold.

The first frame mounting member(s) 105A, 105B and the second frame mounting member(s) 105C, 105D are attached to either side of the crossbar 108 to support and attach the hitch 102 to the vehicle 100. In some examples, the first frame mounting member(s) 105A, 105B and/or the second frame mounting member(s) 105C, 105D are coupled to the crossbar 108 via welds. However, the first frame mounting member(s) 105A, 105B and/or the second frame mounting member(s) 105C, 105D can be coupled to the crossbar 108 via any other suitable means (e.g., riveted, press-fit, etc.). While one example implementation of the first frame mounting member(s) 105A, 105B and/or the second frame mounting member(s) 105C, 105D is illustrated in FIG. 1, the first frame mounting member(s) 105A, 105B and/or the second frame mounting member(s) 105C, 105D can have any other suitable shape, etc.

The crossbar attachment point(s) 109A, 109B include the crossbar 108, the pivot pin(s) 110A, 110B, the load attachment member(s) 112A, 112B, and/or the endplate(s) 114A, 114B. In some examples, the crossbar attachment point(s) 109A, 109B serve as additional point(s) of stabilization to reduce torsional loading on the hitch 102. The crossbar attachment point(s) 109A, 109B can support hitch accessories that produce relatively low levels of torsional loading (e.g., a bike rack) and/or hitch accessories that produce relatively high levels of torsional loading (e.g., a drag plow with potential for side-to-side twisting). For example, the crossbar attachment point(s) 109A, 109B can be customized depending on the type of load that a user anticipates. In some examples, the crossbar attachment point(s) 109A, 109B can be modified to include the endplate(s) 114A, 114B welded to the crossbar 108 to support attachment of a tow ball to the endplate(s) 114A, 114B. In some examples, the crossbar attachment point(s) 109A, 109B can include a combination of the endplate(s) 114A, 114B with the pivot pin(s) 110A, 110B to provide support for load attachments with potential for increased torsional loading. In some examples, the crossbar attachment point(s) 109A, 109B can include the load attachment member(s) 112A, 112B (e.g., a draw-bar link loaded in tension, a yoke endplate to limit lateral movement, etc.) to support user-selected load attachments. In some examples, both crossbar attachment points 109A and 109B can be used on the crossbar 108, thereby providing a total of two additional attachment points for hitch-based accessories, such that the accessory does not require ad-hoc attachment to an example bumper 101 or another portion of the vehicle but, rather, can be secured and/or stabilized using the crossbar attachment point(s) 109A, 109B on either side of the crossbar and/or the receiver tube attachment point 118 (e.g., to form a three-point crossbar attachment system).

The pivot pin(s) 110A, 110B provide bearing surfaces to receive the load attachment member(s) 112A, 112B. In some examples, ends of the pivot pin(s) 110A, 110B include a threaded surface that secures the pivot pin(s) 110A, 110B to their respective endplate(s) 114A, 114B. For example, the pivot pin(s) 110A, 110B can be positioned within a threaded hole centered within each of the endplate(s) 114A, 114B. In some examples, the pivot pin(s) 110A, 110B can be used for attachment and stabilization of hitch accessories that produce increased torsional loading (e.g., a tailgate salter, a pull plow, etc.) that would otherwise be attached (e.g., via cargo straps, ratchet straps, etc.) to other vehicle body locations that are not intended for such loading (e.g., bumper edges, sheet metal panels, etc.). Stabilization of such loads using the crossbar attachment point(s) 109A, 109B, including the pivot pin(s) 110A, 110B, further improves overall vehicle mobility by reducing dynamic motion from poorly attached hitch accessories.

The load attachment member(s) 112A, 112B can be any type of attachment member (e.g., a draw-bar link loaded in tension, a yoke endplate to limit lateral movement, etc.) used to support user-selected load attachments. For example, the load attachment member(s) 112A, 112B can be loaded in tension by an implement attached to the tow vehicle 100 (e.g., a pull plow). For example, the implement (e.g., a pull plow) can be attached to the crossbar 108 via the load attachment member(s) 112A, 112B at the crossbar attachment point(s) 109A, 109B located on either end of the crossbar 108, in addition to being attached to the center hitch point (e.g., receiver tube attachment point 118). As such, all three points (e.g., two crossbar attachment point(s) 109A, 109B and the receiver tube attachment point 118) share the induced tensile load (e.g., when the vehicle 100 is moving forward) and/or the compression load (e.g., when the vehicle 100 is moving in reverse). As described in connection with FIG. 2, the load attachment member(s) 112A, 112B can be a static yoke in which a keeper piece is required to complete a mechanical pivot point. In some examples, the load attachment member(s) 112A, 112B can include a kinematic drawbar in which the yoke provides a tensile loading mechanism with hinging jaws that can capture a full circumference of the pivot pin 110 circumferential bearing surface. For example, the yoke can include one or more stress/strain sensor(s) (e.g., strain gage(s)) in communication with the vehicle (e.g., via the sensor interface 125, the vehicle interface 135, etc.). As such, data received from the one or more stress/strain sensor(s) can be used to alert a driver (e.g., indicated unbalanced loading, etc.). In some examples, the driver can perform manual corrective actions. In some examples, automated corrective actions can be performed using a vehicle's interfacing control module(s) (e.g., to derate a throttle, decrease vehicle speed, increase braking, etc.).

The endplate(s) 114A, 114B can be positioned on a first end and/or a second end of the crossbar 108. For example, edges of the crossbar 108 can include one or more tabs to receive and/or orient the endplate(s) 114A, 114B. In some examples, the endplate(s) 114A, 114B are welded to the crossbar 108. In some examples, the endplate(s) 114A, 114B include a first threaded hole and a second threaded hole, a diameter of the second threaded hole being larger than a diameter of the first threaded hole, as described in connection with FIG. 3A. In some examples, the first threaded hole of the endplate(s) 114A, 114B is positioned adjacent to a perimeter of the endplate(s) 114A, 114B. In some examples, the second threaded hole is centered within the endplate(s) 114A, 114B. For example, the first threaded hole of the endplate(s) 114A, 114B can be used to support load path attachments with reduced torsional loading (e.g., a bike carrier), while the second threaded hole of the endplate(s) 114A, 114B can be used to support load path attachments with increased torsional loading (e.g., a pull plow). In some examples, load path attachments with increased torsional loading (e.g., a pull plow) can be secured to the crossbar 108 via the pivot pin(s) 110A, 110B which are positioned within the second threaded holes of the respective endplate(s) 114A, 114B. In some examples, the second threaded holes of the endplate(s) 114A, 114B can each receive a tow ball.

The chain bracket 116 acts as a redundant attachment point between the hitch 102 and a coupled trailer. For example, one or more chains or similar mechanical elements can be coupled to the hitch 102 and the chain bracket 116. In operation, if the primary coupling between the trailer and the hitch 102 disconnects (e.g., the coupling via the receiver tube 120, etc.), the chain(s) prevent the trailer from becoming completely detached from the hitch 102.

The receiver tube attachment point 118 includes the receiver tube 120 and is used as a central attachment point for an implement (e.g., a pull plow) supported by the hitch 102. In some examples, the receiver tube attachment point 118 can be combined with the crossbar attachment point(s) 109A, 109B to provide a three-point crossbar attachment system. In some examples, the receiver tube attachment point 118 can include a towing element (e.g., a drawbar) used for securing an implement (e.g., a trailer, etc.). As such, the receiver tube attachment point 118 can provide a central attachment point for the implement, while the crossbar attachment point(s) 109A, 109B provide two outer attachment points relative to the hitch 102, thereby counteracting torsional twist applied to the receiver tube attachment point 118 and its corresponding towing element (e.g., a drawbar, etc.).

The receiver tube 120 can be used to couple a towing element (e.g., a hitch ball, a drawbar, etc.) to the vehicle 100 and can have a square cross-section. Load applied at the receiver tube 120 to the vehicle 100 can be transferred by a crossbar (e.g., the crossbar 108). The crossbar 108 can, in some examples, include a quadrilateral cross-section. In other examples, the crossbar 108 can have any other suitable cross-section (e.g., polygonal, circular, ovoid, etc.). In the illustrated example, the crossbar 108 is a single, continuous tube. In other examples, the crossbar 108 can be two tubes bisected by the receiver tube 120.

The first frame mounting member(s) 105A, 105B, the second frame mounting member(s) 105C, 105D, the crossbar 108, the pivot pin 110, and/or the endplate(s) 114A, 114B can be composed of any suitable material or combination thereof (e.g., aluminum, cast iron, steel, plastic, etc.). In some examples, the first frame mounting member(s) 105A, 105B, the second frame mounting member(s) 105C, 105D, the crossbar 108, the pivot pin 110, and/or the endplate(s) 114A, 114B are manufactured via stamping. In other examples, the first frame mounting member(s) 105A, 105B, the second frame mounting member(s) 105C, 105D, the crossbar 108, the pivot pin 110, and/or the endplate(s) 114A, 114B can be manufactured via any suitable manufacturing process or combination thereof (e.g., weldment casting, extrusion, etc.).

In the illustrated example of FIG. 1, the load manager 103 includes an example sensor interface 125, an example load determiner 130, and an example vehicle interface 135. The example sensor interface 125 receives data from one or more tow ball(s) attached to the crossbar 108 (e.g., via the endplate(s) 114A, 114B), one or more tow ball(s) positioned on a load path attachment (e.g., a trailer), and/or any other components of the vehicle 100 and/or the hitch 102. For example, the tow ball(s) can provide real-time data to the sensor interface 125. In some examples, the sensor interface 125 can convert the data received from the components into a numerical form (e.g., human readable, etc.). For example, if a load-sensing sensor outputs an analog signal (e.g., an analog voltage, an analog current, etc.) the sensor interface 125 can convert the received data into values corresponding to the loads detected by the hitch 102.

The example load determiner 130 analyzes the received load signal(s) from the one or more tow ball(s) to determine the load condition of the vehicle 100 (e.g., a torsional load condition), as described in connection with FIG. 4. For example, the load determiner 130 can use torsional stiffness to determine loading conditions on the vehicle 100. In some examples, the load determiner 130 can determine if the load condition satisfies an alert threshold. In some examples, the alert threshold corresponds to an improper load (e.g., misload, unbalanced, etc.) condition.

The example vehicle interface 135 generates a notification to be presented to a user of the vehicle 100. For example, the vehicle interface 135 can generate an alert if the load determiner 130 identifies torsional loading levels that meet a predefined threshold. In some examples, the vehicle interface 135 can generate a visual alert to be presented to the user via the display 104. Additionally or alternatively, the vehicle interface 135 can generate an auditory alert to be presented to the user (e.g., the alert may be presented over speakers of the vehicle 100, a mobile device of the user, etc.). In some examples, the vehicle interface 124 can generate instructions indicating to the user how to correct the load condition. In some examples, the vehicle interface 135 can enable the load manager 103 to receive data from the vehicle 100. For example, the vehicle interface 135 can receive implement dimensions (e.g., horizontal dimensions of a snow plow, etc.) from the vehicle 100 (e.g., input by a user into the interface of the vehicle 100, etc.) and/or other information relevant to the determination of a loading condition (e.g., number of tow balls positioned on a load path attachment, etc.). In some examples, the vehicle interface 135 can receive data from additional sensors associated with the vehicle 100 (e.g., accelerometers, etc.). In such examples, the load determiner 130 can further determine the load condition (e.g., torsional loading) based on data from any other sensors of the vehicle 100. In some examples, the vehicle interface 135 generates a notification to the user if a tow ball is not recognized and/or if there is no detectable data input from the tow ball(s) positioned on the crossbar 108 and/or the load path attachment (e.g., trailer).

While an example manner of implementing the load manager 103 of FIG. 1 is illustrated in FIG. 1, one or more of the elements, processes and/or devices illustrated in FIG. 1 may be combined, divided, re-arranged, omitted, eliminated and/or implemented in any other way. Further, the example sensor interface 125, the example load determiner 130, and the example vehicle interface 135 and/or, more generally, the example load manager 103 of FIG. 1 may be implemented by hardware, software, firmware and/or any combination of hardware, software and/or firmware. Thus, for example, any of the example sensor interface 125, the example load determiner 130, and the example vehicle interface 135 and/or, more generally, the example load manager 103 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 125, the example load determiner 130, and the example vehicle interface 135 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 103 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
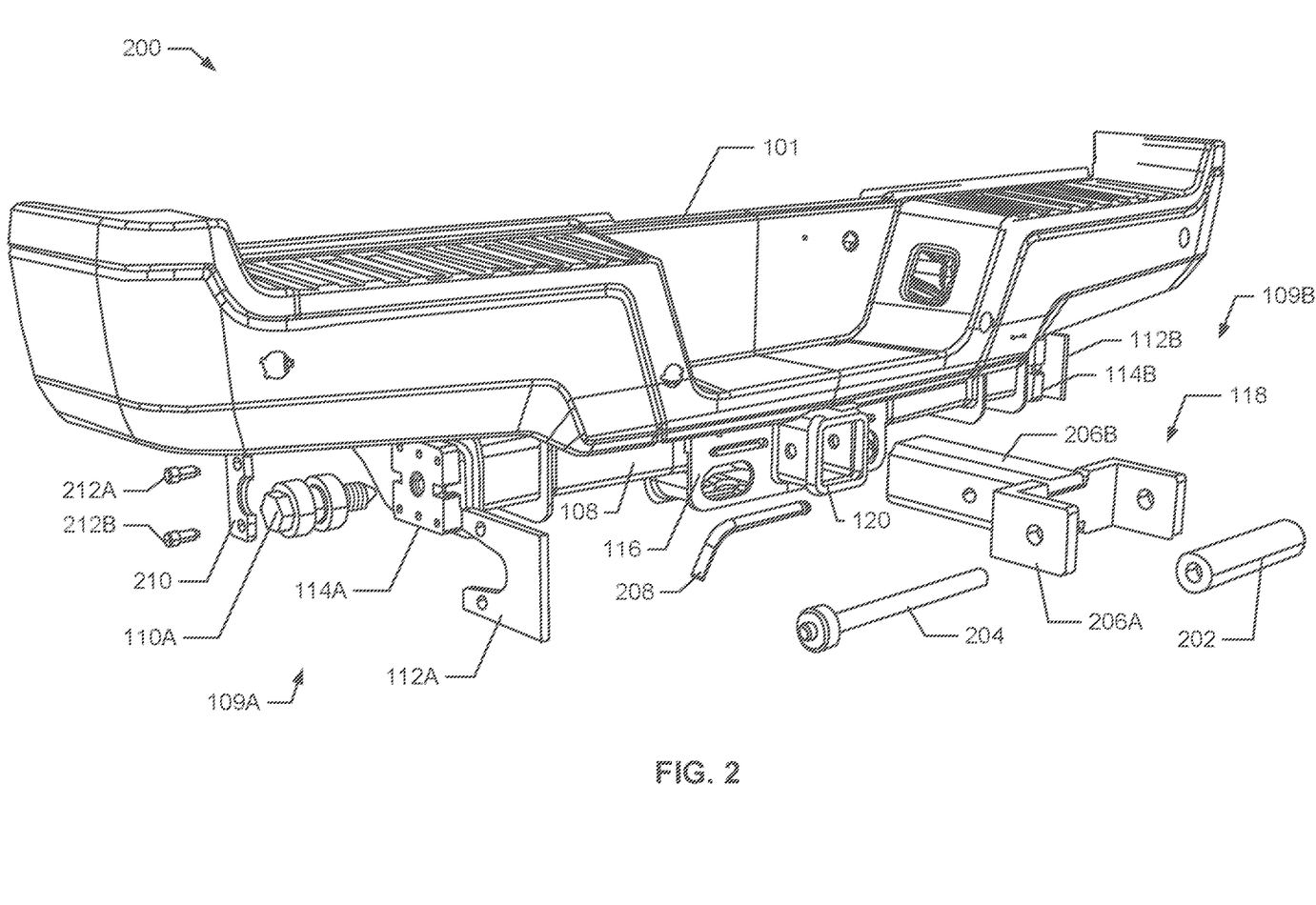
FIG. 2 illustrates an example perspective view of the hitch of FIG. 1, including individual hitch accessories used to form the hitch attachment points.

FIG. 2 illustrates an example perspective view 200 of the hitch 102 of FIG. 1, including individual hitch accessories used to form the hitch attachment points (e.g., the crossbar attachment point(s) 109A, 109B, the receiver tube attachment point 118). In the example of FIG. 2, the hitch 102 is located below the bumper 101. The crossbar attachment point(s) 109A, 109B include the pivot pin(s) 110A, 110B (only one of which is shown), the load attachment member(s) 112A, 112B, and/or the endplate(s) 114A, 114B. Additionally, the crossbar attachment point(s) 109A, 109B include an example capture plate 210 attached to the load attachment member 112 using example bolt(s) 212A, 212B. As described in more detail in connection with FIG. 3A, the capture plate 210 and load attachment member(s) 112A, 112B can be used, in some examples, to complete a mechanical pivot point. The crossbar attachment point(s) 109A, 109B can be positioned on both sides of the crossbar 108. In addition to the crossbar attachment point(s) 109A, 109B, the hitch 102 includes the receiver tube attachment point 118. In the example of FIG. 2, the receiver tube attachment point 118 includes the receiver tube 120, an example cylindrical sleeve 202, an example drawbar bushing pin 204, an example towing element front section 206A, an example towing element back section 206B, and an example tow hitch pin 208. However, any other type of receiver tube-based attachments can be used in place of the illustrated example attachments.

In the example of FIG. 2, the receiver tube attachment point 118 acts as a central attachment point for a load path attachment (e.g., a trailer, etc.). For example, the towing element back section 206B can be inserted into the receiver tube 120 and secured in position using the tow hitch pin 208. Likewise, the cylindrical sleeve 202 can be secured in position within the towing element front section 206A using the drawbar bushing pin 204, resulting in the full assembly of the receiver tube attachment point 118 as shown in FIG. 1. For example, the cylindrical sleeve 202 can be used for securing a given load path attachment to the hitch 102. In the examples disclosed herein, a load path attachment can be secured to a hitch not only at the receiver tube attachment point 118, but also at the two additional attachment points provided by the crossbar attachment point(s) 109A, 109B. For example, as described in connection with FIG. 4, a trailer can be secured to the crossbar 108 at the receiver tube attachment point 118, as well as at the crossbar attachment point(s) 109A, 109B using tow balls and/or push-pull coil spring strut arm(s).

Figure 3A:
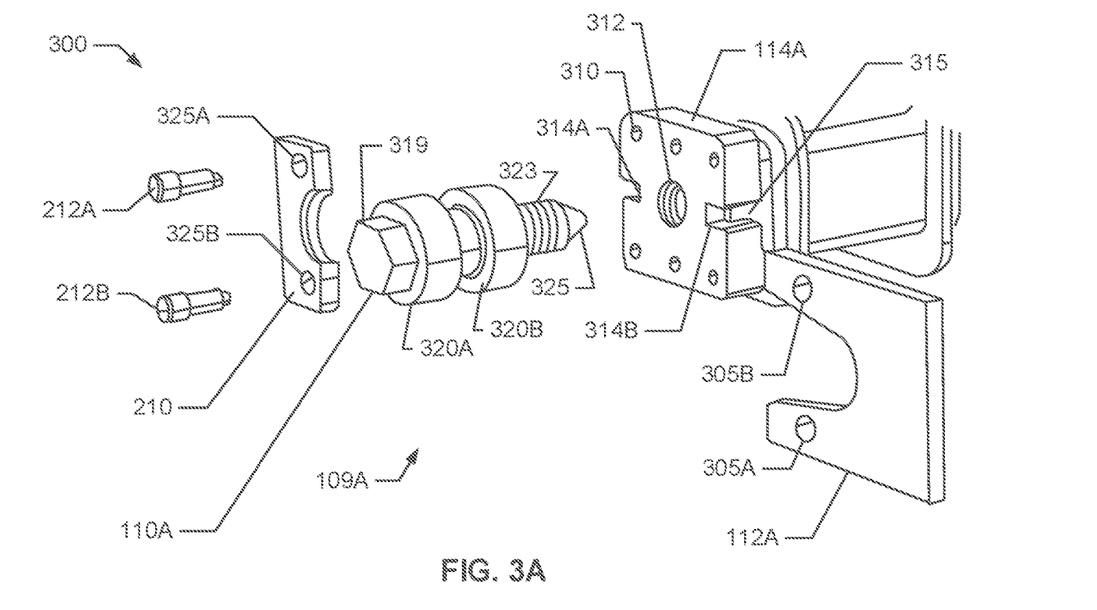
FIG. 3A illustrates an example perspective view of the hitch of FIG. 2, including an example endplate and a pivot pin used to form an attachment point to one end of the hitch of FIG. 1.

FIG. 3A illustrates an example perspective view 300 of the hitch of FIG. 2, including the pivot pin 110A and the endplate 114A used to form an attachment point at one end of the hitch 102 of FIG. 1 (e.g., the crossbar attachment point 109A). In the example of FIG. 3A, the endplate 114A includes one or more first threaded holes 310 having a first diameter and positioned adjacent to the perimeter of the endplate 114A. In some examples, the one or more first threaded holes 310 are used to secure and/or stabilize a load path attachment that produces relatively low torsional loading (e.g., a bike rack). In some examples the one or more first threaded holes 310 are M10 threaded holes. However, any other thread size or sizes can be used instead. In some examples, the endplate 114A includes a second threaded hole 312 having a second diameter, where the second diameter is larger than the first diameter. In some examples, the second threaded hole 312 is an M30 threaded hole. However, any other thread type or size can be used instead. The second threaded hole 312 can be positioned in the center of the endplate 114A, as shown in the example of FIG. 3A, and can threadably receive the pivot pin 110. For example, the second threaded hole 312 can include a female thread to receive a male thread of the pivot pin 110 (e.g., a standard tow ball male thread). In other examples, the second threaded hole 312 can receive a tow ball. In some examples, the endplate 114A is welded to an example edge 315 of the crossbar 108, as described in connection with FIG. 3B. For example, the endplate 114A can include example notches 314A, 314B for orienting the endplate 114A relative to the crossbar edge 315. However, the endplate 114A can be removable and/or secured to the crossbar 108 using any other method. While not shown in the example of FIG. 3A, the crossbar attachment point 109B (e.g., including the load attachment member 112B and/or the endplate 114B) can be similarly described as presented above in connection with the crossbar attachment point 109A.

The pivot pin 110 includes an example head 319, example shoulders 320A, 320B, an example threaded tip 323, and an example bull nose 325. In some examples, the pivot pin head 319 is hexagonal. In some examples, a fastening tool interacts with the pivot pin head 319 to ensure torque retention. In some examples, the load attachment member(s) 112A, 112B can include a kinematic drawbar which provides a tensile loading mechanism that can capture a full circumference of the pivot pin 110 circumferential bearing surface (e.g., hinging jaws used to capture the pivot pin head 319). For example, the drawbar can constrain a first section of the captured pivot pin 110 bearing surface such that the bearing surface can serve as a reaction surface during compressive loading (e.g., the vehicle 100 reversing while supporting a load from the load path attachment). In some examples, the capture plate 210 can constrain and/or capture a second section of the pivot pin 110 bearing surface, thereby allowing the load attachment member(s) 112A, 112B to be placed in tensile loading (e.g., towing and/or pulling). The pivot pin 110 can include shoulders 320A, 320B used to support the positioning and/or attachment of the load attachment member(s) 112A, 112B and/or the capture plate 210. For example, the load attachment member 112A can be positioned between the shoulders 320A, 320B and the capture plate 210 used to secure the load attachment member 112A to the pivot pin 110 via the bolts 212A, 212B. For example, capture plate openings 325A, 325B can align with the load attachment member opening(s) 305A, 305B to allow for the insertion of bolt(s) 212A, 212B to secure the capture plate 210 to the load attachment member 112A. For example, the bolts 212A, 212B can thread into the load attachment member opening(s) 305A, 305B. While the load attachment member 112A is shown in FIG. 3A in combination with capture plate 210, any other type of attachment member (e.g., a static yoke) alone or in combination with any other type of capture plate (e.g., a keeper piece) can be secured to the pivot pin (e.g., between the shoulders 320A, 320B). For example, the load attachment member 112A and/or the capture plate 210 can be used to complete a mechanical pivot point. Additionally, the pivot pin 110 can include the threaded tip 323 and the unthreaded bull nose 325. For example, the bull nose 325 can be unthreaded to serve as a self-aligning feature. For example, the bull nose 325 can be used to center a male thread to a female thread and/or prevent cross-threading when securing the pivot pin 110 to the endplate(s) 114A, 114B.

Figure 3B:
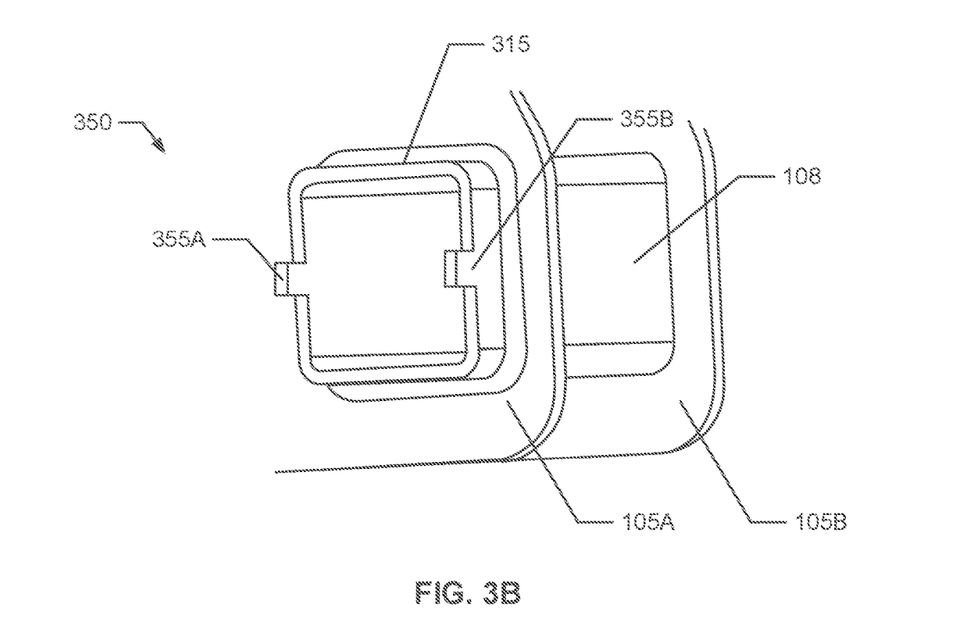
FIG. 3B illustrates an example perspective view of the crossbar of FIG. 3A without any additional attachment accessories.

FIG. 3B illustrates an example perspective view 350 of the crossbar 108 of FIG. 3A without any additional attachment accessories. In the example of FIG. 3B, the crossbar 108 includes tab(s) 355A, 355B protruding from the crossbar edge 315. In some examples, the tab(s) 355A, 355B can be used to orient the endplate(s) 114A, 114B, such that the tab(s) 355A, 355B protrude into the space provided by the notches 314A, 314B within the endplate(s) 114A, 114B. In some examples, the endplate(s) 114A, 114B can be welded to the crossbar edge 315 once the endplate(s) 114A, 114B have been accurately positioned on the crossbar edge 315 (e.g., via the tab(s) 355A, 355B and/or the notches 314A, 314B). For example, the endplate(s) 114A, 114B can be welded to the crossbar 108 using any welding processes (e.g., metal inert gas, laser beam welding, shielded-metal arc welding, flux-cored arc welding, gas tungsten arc welding, etc.) and/or any other alternative methods of attachment (e.g., using rivets, bolts, etc.) that can withstand any potential loading at the crossbar/endplate interface.

Figure 4:
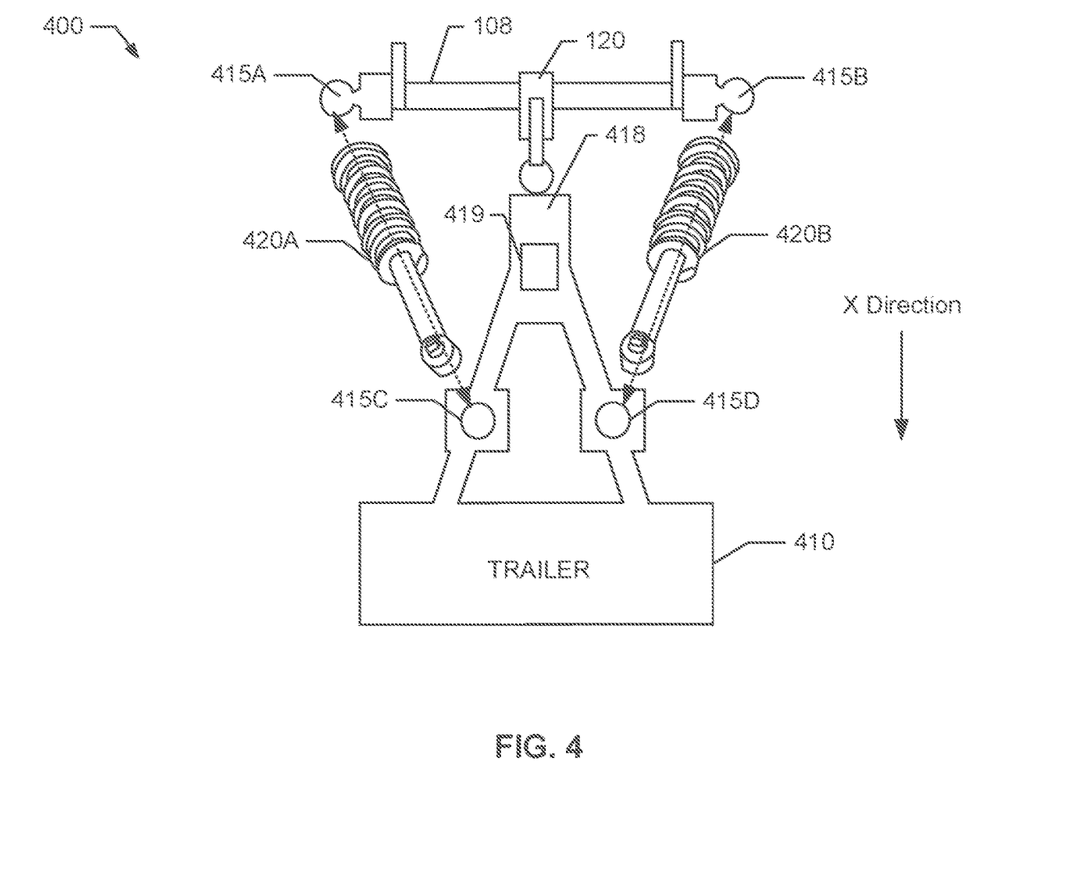
FIG. 4 illustrates an example overhead view of a trailer attached to the hitch of FIG. 1 using push-pull coil spring strut arms to form an example three-point crossbar attachment system.

FIG. 4 illustrates an example overhead view 400 of an example trailer 410 attached to the hitch 102 of FIG. 1 using example mounted push-pull coil spring strut arm(s) 420A, 420B to form an example three-point crossbar attachment system. In the example of FIG. 4, tow ball(s) 415A, 415B can be attached to either end of the crossbar 108 (e.g., via the endplate(s) 114A, 114B). For example, the tow ball(s) 415A, 415B can be connected to the endplate(s) 114A, 114B using the threaded hole(s) of the second diameter 312, as described in connection with FIG. 3A. In the example of FIG. 4, two additional tow ball(s) 415C, 415D can be positioned on the load path attachment (e.g., an example trailer 410). For example, the trailer 410 can be attached to the crossbar 108 via three points of attachment: (1) at an example drawbar 418 linked to the receiver tube 120, (2) at the tow ball 415A attached to a first end of the crossbar 108 via a first endplate 114A, and (3) at the tow ball 415B attached to a second end of the crossbar 108 via a second endplate 114B. In the example of FIG. 4, the tow ball(s) 415A, 415B positioned on the crossbar 108 and the tow ball(s) 415C, 415D positioned on the load path attachment (e.g., trailer 410) are linked using mounted push-pull coil spring strut arm(s) 420A, 420B. For example, the push-pull coil spring strut arm(s) 420A, 420B form outer attachments of the load path to the hitch 102 to counteract torsional twisting of the hitch 102. For example, the mounted push-pull coil spring strut arm(s) 420A, 420B can replace chain and torsion bar systems for improved backing capability (e.g., by avoiding disconnection of the load path attachment from the hitch 102). As described in connection with FIG. 5, the load manager 103 determines a load condition based on data received from one or more processors associated with the tow ball(s) 415A, 415B, 415C, 415D. In some examples, the drawbar 418 and/or any other hitch accessory can include an example lockable tow ball storage area 419 to store tow ball(s) 415A, 415B, 415C, 415D when the tow ball(s) 415A, 415B, 415C, 415D are not in use.

Figure 5:
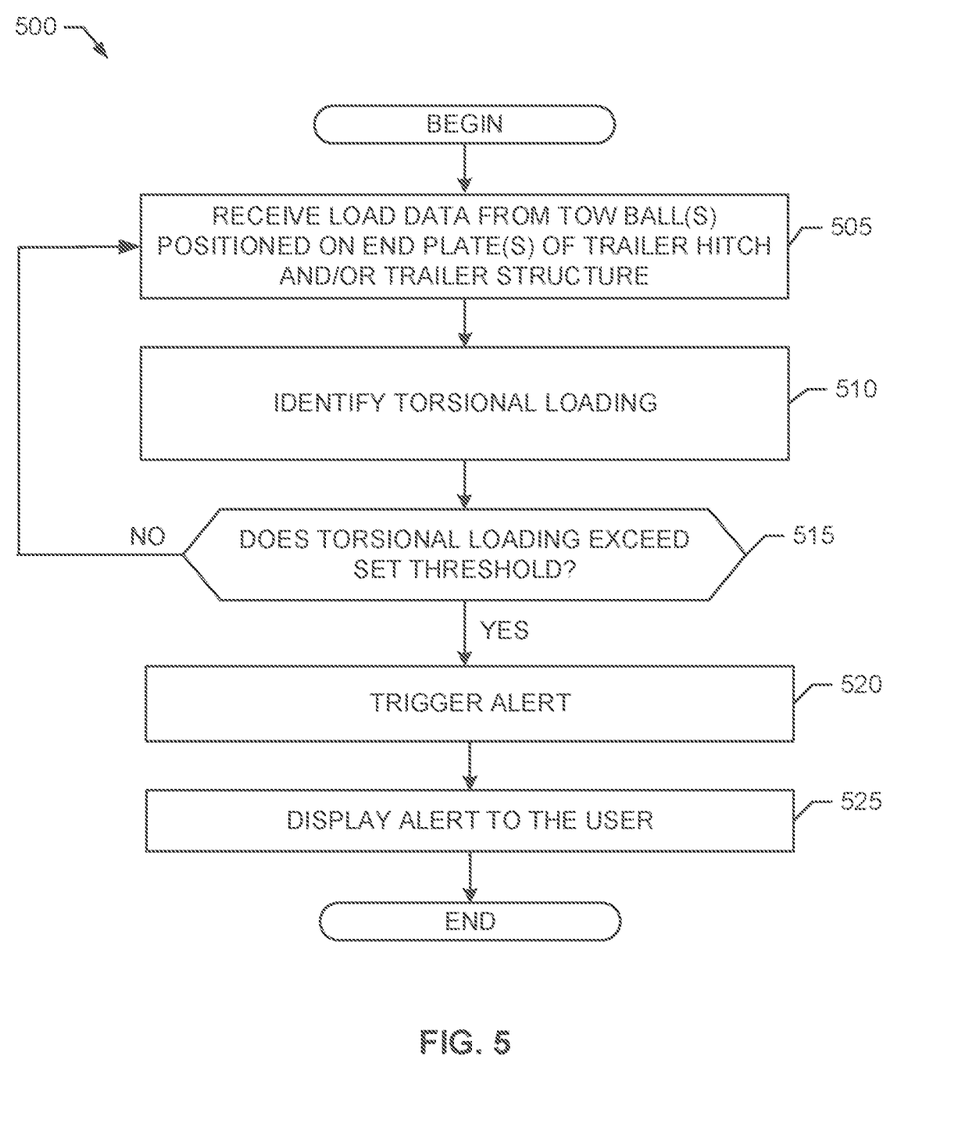
FIG. 5 is a flowchart representative of machine readable instructions that may be executed to implement the load manager of FIG. 1.

A flowchart representative of example methods, hardware implemented state machines, and/or any combination thereof for implementing the load manager 103 of FIG. 1 is shown in FIG. 5. The method may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example load manager 103 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example method 500 of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of machine readable instructions 500 that may be executed to implement the load manager 103 of FIG. 1. In the example of FIG. 5, the sensor interface 125 receives load data from tow ball(s) (e.g., tow ball(s) 415A, 415B, 415C, 415D of FIG. 4) positioned on the hitch 102 and/or the load path attachment (e.g., trailer 410) (block 505). In some examples, the sensor interface 125 receives data from the tow ball(s) 415A, 415B, 415C, 415D in an analog signal (e.g., a voltage, a current, etc.). In some examples, the sensor interface 125 converts the analog signal into a digital value (e.g., a force, a pressure, etc.). Once the sensor interface 125 has received data from the tow ball(s) 415A, 415B, 415C, 415D, the load determiner 130 determines load conditions of the hitch 102 (e.g., torsional loading) based on data from the tow ball(s) 415A, 415B, 415C, 415D (block 510). In some examples, the load determiner 130 can determine at least one of a vertical load condition, a horizontal load condition, and/or a lateral load condition. In other examples, the load determiner 130 can use any other suitable means to determine the load condition.

The load determiner 130 further determines if the torsional loading exceeds a set threshold value (block 515). If the load determiner 130 determines that the torsional loading exceeds a set threshold value, the load determiner 130 can trigger an alert to inform the user (block 520). However, if the torsional loading does not exceed a set threshold value, control returns to block 505, allowing the sensor interface 125 to continue receiving real-time load data from tow ball(s) 415A, 415B, 415C, 415D. If an alert is triggered, the display 104 can be used to display the alert to a user (block 525). In some examples, the load determiner 130 can be used to estimate allowable torsional loading on the hitch 102 to promote better utilization of trailer hitch systems in combination with hitch-based accessories. If the hitch 102 is determined to not be able to withstand the anticipated torsional loading based on user provided input data and/or initial tow ball readings, the load determiner 130 can generate an audio alert, a visual alert, etc. In some examples, the load determiner 130 can generate an alert including a description of the torsional loading condition triggering the alert (e.g., location of excess loading, tow ball reading associated with excess torsional loading, etc.). For example, a load path attachment can be repositioned to balance any torsional loading and/or ensure a secure attachment at all available attachment points. In some examples, the load determiner 130 can generate an instruction indicating how to correct the torsional loading. In some examples, the vehicle interface 135 can cause the vehicle 100 to present the torsional load condition and/or the alert to the user via the display 104.

Figure 6:
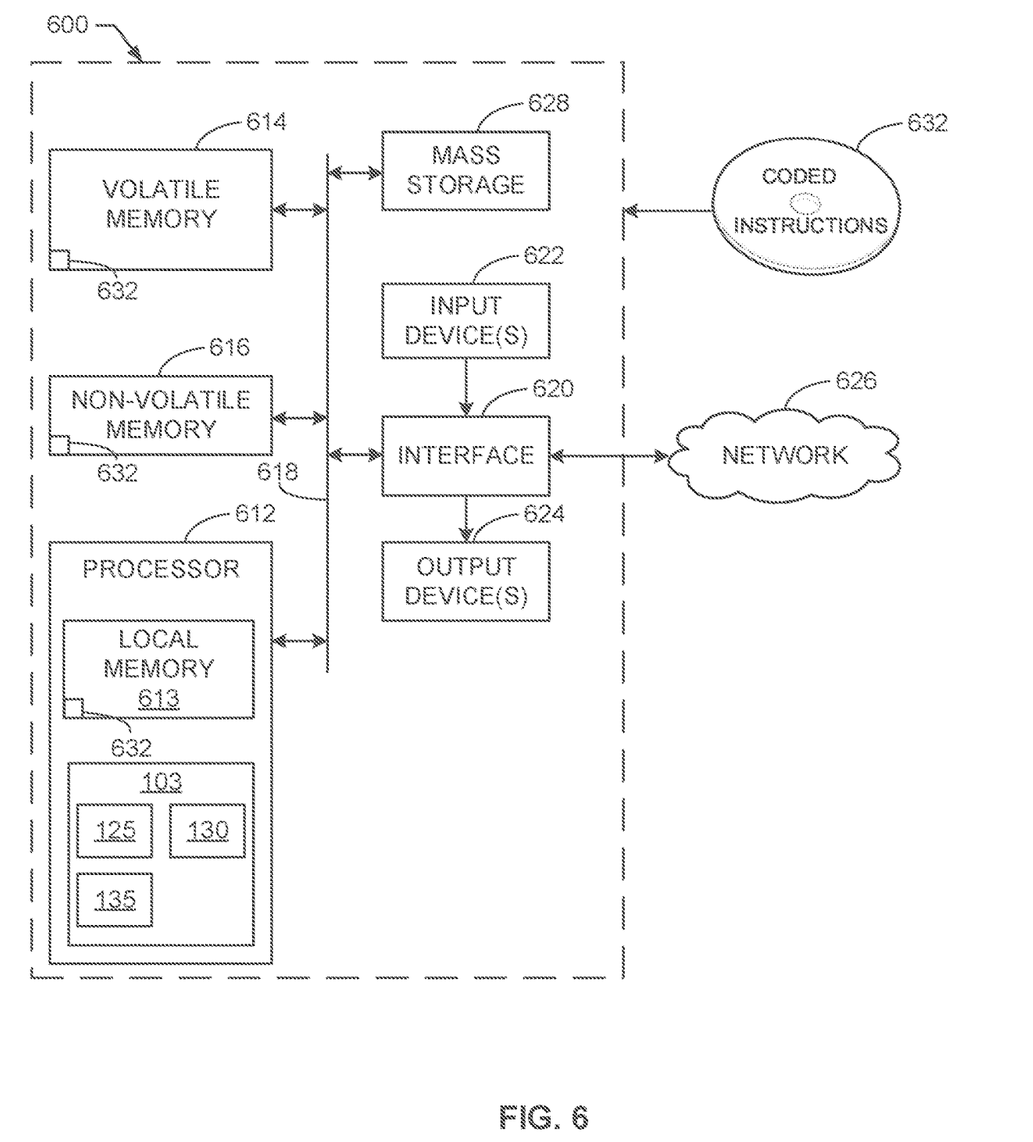
FIG. 6 is a block diagram of an example processing platform structured to execute the instructions of FIG. 5 to implement the load manager of FIG. 1.

FIG. 6 is a block diagram of an example processing platform 600 structured to execute the instructions of FIG. 5 to implement the load manager 103 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 125, the example load determiner 130, and the example vehicle interface 135.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 7 may be stored in the mass storage device 628, in the volatile memory 614, in the non-volatile memory 616, and/or on a removable non-transitory computer readable storage medium such as a CD or DVD.

Example methods and apparatus for a three-point attachment trailer hitch are disclosed herein. Example 1 includes a hitch comprising a crossbar including a first end and a second end, the first end or the second end including at least one tab protruding from an edge of the first end or the second end, and a first endplate positioned on the first end or the second end of the crossbar using the at least one tab, the endplate including a first threaded hole and a second threaded hole, a diameter of the second threaded hole larger than a diameter of the first threaded hole.

Example 2 includes the hitch of example 1, wherein the first endplate is welded to the crossbar.

Example 3 includes the hitch of example 1, further including a pivot pin positioned within the second threaded hole.

Example 4 includes the hitch of example 3, wherein the pivot pin includes a hexagonal head.

Example 5 includes the hitch of example 3, wherein the pivot pin includes a bearing surface to receive a first load attachment member.

Example 6 includes the hitch of example 5, wherein the first load attachment member secures a first implement, the first implement including a plow.

Example 7 includes the hitch of example 1, further comprising a second endplate on the second end of the crossbar, the first endplate, the second endplate, and a drawbar to form a three-point crossbar attachment system.

Example 8 includes the hitch of example 1, wherein, when the second threaded hole receives a tow ball and the first threaded hole receives a load attachment member to secure an implement.

Example 9 includes the hitch of example 8, wherein the implement is a bike rack.

Example 10 includes the hitch of example 1, wherein at least two threaded holes of equal diameter are positioned adjacent to a perimeter of the endplate.

Example 11 includes the hitch of example 1, wherein the second threaded hole is centered within the endplate.

Example 12 includes an apparatus comprising a hitch including a crossbar having a first end and a second end, the first end or the second end including at least one tab protruding from an edge of the first end or the second end, a first endplate positioned on the first end of the crossbar using the at least one tab, the endplate including a threaded hole, a first tow ball attached to the threaded hole of the endplate, the first tow ball including a processor, and a load manager to determine a load condition based on data received from the processor of the first tow ball.

Example 13 includes the apparatus of example 12, wherein a first push pull coil spring swivel arm connects the first tow ball attached to the endplate to a second tow ball positioned on a load path attachment.

Example 14 includes the apparatus of example 13, wherein the load path attachment includes a trailer.

Example 15 includes the apparatus of example 13, further including a third tow ball attached to a second endplate, the second endplate positioned on the second end of the crossbar, a second push pull coil spring swivel arm connecting the third tow ball to a fourth tow ball on the load path attachment.

Example 16 includes the apparatus of example 15, wherein the first push pull coil spring swivel arm and the second push pull coil spring swivel arm form outer attachments of the load path to the hitch to counteract torsional twisting of the hitch.

Example 17 includes the apparatus of example 15, wherein the load manager determines the load condition based on input data from the first tow ball, the second tow ball, the third tow ball, or the fourth tow ball.

Example 18 includes a method, comprising receiving data from a first tow ball attached to a first endplate, the first endplate positioned on a first end of a hitch crossbar, the crossbar including at least one tab protruding from an edge of the first end of the crossbar to receive the first endplate, and determining a load condition based on the input data.

Example 19 includes the method of example 18, wherein a first push pull coil spring swivel arm connects the first tow ball to a second tow ball positioned on a load path attachment.

Example 20 includes the method of example 19, further including a third tow ball attached to a second endplate, the second endplate positioned on a second end of the crossbar, a second push pull coil spring swivel arm to connect the third tow ball to a fourth tow ball on the load path attachment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hitch comprising:
   a crossbar including a first end and a second end, the first end or the second end including at least one tab protruding from an edge of the first end or the second end; and
   a first endplate positioned on the first end or the second end of the crossbar using the at least one tab, the endplate including a first threaded hole and a second threaded hole, a diameter of the second threaded hole larger than a diameter of the first threaded hole.

2. The hitch of claim 1, wherein the first endplate is welded to the crossbar.

3. The hitch of claim 1, further including a pivot pin positioned within the second threaded hole.

4. The hitch of claim 3, wherein the pivot pin includes a hexagonal head.

5. The hitch of claim 3, wherein the pivot pin includes a bearing surface to receive a first load attachment member.

6. The hitch of claim 5, wherein the first load attachment member secures a first implement, the first implement including a plow.

7. The hitch of claim 1, further comprising a second endplate on the second end of the crossbar, the first endplate, the second endplate, and a drawbar to form a three-point crossbar attachment system.

8. The hitch of claim 1, wherein, when the second threaded hole receives a tow ball and the first threaded hole receives a load attachment member to secure an implement.

9. The hitch of claim 8, wherein the implement is a bike rack.

10. The hitch of claim 1, wherein at least two threaded holes of equal diameter are positioned adjacent to a perimeter of the endplate.

11. The hitch of claim 1, wherein the second threaded hole is centered within the endplate.

12. An apparatus comprising:
    a hitch including:
      a crossbar having a first end and a second end, the first end or the second end including at least one tab protruding from an edge of the first end or the second end;
      a first endplate positioned on the first end of the crossbar using the at least one tab, the endplate including a threaded hole;
      a first tow ball attached to the threaded hole of the endplate, the first tow ball including a processor; and
      a load manager to determine a load condition based on data received from the processor of the first tow ball.

13. The apparatus of claim 12, wherein a first push pull coil spring swivel arm connects the first tow ball attached to the endplate to a second tow ball positioned on a load path attachment.

14. The apparatus of claim 13, wherein the load path attachment includes a trailer.

15. The apparatus of claim 13, further including a third tow ball attached to a second endplate, the second endplate positioned on the second end of the crossbar, a second push pull coil spring swivel arm connecting the third tow ball to a fourth tow ball on the load path attachment.

16. The apparatus of claim 15, wherein the first push pull coil spring swivel arm and the second push pull coil spring swivel arm form outer attachments of the load path to the hitch to counteract torsional twisting of the hitch.

17. The apparatus of claim 15, wherein the load manager determines the load condition based on input data from the first tow ball, the second tow ball, the third tow ball, or the fourth tow ball.

18. A method, comprising:
 receiving input data from a first tow ball attached to a first endplate, the first endplate positioned on a first end of a hitch crossbar, the crossbar including at least one tab protruding from an edge of the first end of the crossbar to receive the first endplate; and
 determining a load condition based on the input data.

19. The method of claim 18, wherein a first push pull coil spring swivel arm connects the first tow ball to a second tow ball positioned on a load path attachment.

20. The method of claim 19, further including a third tow ball attached to a second endplate, the second endplate positioned on a second end of the crossbar, a second push pull coil spring swivel arm to connect the third tow ball to a fourth tow ball on the load path attachment.

\* \* \* \* \*